US012737137B2

(12) United States Patent
Shknevsky et al.

(10) Patent No.: US 12,737,137 B2
(45) Date of Patent: Sep. 15, 2026

(54) ADVANCED DEDUPLICATION EFFICIENCY BY CANDIDATE SEQUENCE SELECTION

(71) Applicant: Dell Products L.P., Round Rock, TX (US)

(72) Inventors: Alexander Shknevsky, Fair Lawn, NJ (US); Uri Shabi, Tel Mond (IL)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/982,082

(22) Filed: Dec. 16, 2024

(65) Prior Publication Data

US 2026/0169648 A1 Jun. 18, 2026

(51) Int. Cl.
*G06F 3/06* (2006.01)

(52) U.S. Cl.
CPC .......... *G06F 3/0652* (2013.01); *G06F 3/0604* (2013.01); *G06F 3/0679* (2013.01)

(58) Field of Classification Search
CPC ............. G06F 16/1748; G06F 16/1744; G06F 16/1752; G06F 11/1453; G06F 3/0641; G06F 3/0608
See application file for complete search history.

(56) References Cited

U.S. PATENT DOCUMENTS 11,048,426 B2 6/2021 Shabi et al.
11,481,131 B2 10/2022 Dar et al.
11,494,127 B2 11/2022 Martin et al.
11,507,273 B2 11/2022 Shabi et al.
11,928,092 B2 3/2024 Shilane
2017/0255417 A1* 9/2017 Dain .................. G06F 16/1744
2020/0249860 A1* 8/2020 Faibish ................. G06F 3/0608
2021/0286768 A1* 9/2021 Kucherov ............ G06F 16/137
2022/0100385 A1* 3/2022 Shabi .................... G06F 3/0641

* cited by examiner

*Primary Examiner* — Jane W Benner
(74) *Attorney, Agent, or Firm* — BainwoodHuang

(57) ABSTRACT

Techniques for providing improved advanced deduplication efficiency by candidate sequence selection. The techniques include generating a score for each candidate sequence from among multiple candidate sequences based on dedupe criteria, such as a number of dedupe hints associated with pages in the candidate sequence. The techniques include performing an unaligned dedupe process on the candidate sequence(s) having the highest or higher scores. The dedupe criteria may include a compressibility of each page in the candidate sequence, a bias toward longer matching target sequences, and so on. The techniques include obtaining a correlation between an average score of a number of candidate sequences and a corresponding average unaligned DRR gain, predicting, using the correlation, an expected unaligned DRR gain based on a score for a candidate sequence, and performing an unaligned dedupe process on the candidate sequence based on whether the score and the expected unaligned DRR gain exceed minimum thresholds.

20 Claims, 4 Drawing Sheets

Data cache 116
$202_{c-1}$
$202_c$
$202_{c+1}$
202

Stored data pages 128
$204_{t-1}$
$204_t$
$204_{t+1}$
204

Received pages 202
$202_{c-1}$
$202_c$ (P0-P7)
$202_{c+1}$
$202_c$ (P2)
$204_t$ (P5)
Unaligned offset 206
208
Target pages 204
$204_{t-1}$
$204_t$ (P0-P7)
$204_{t+1}$ (P0-P7)

ADVANCED DEDUPLICATION EFFICIENCY BY CANDIDATE SEQUENCE SELECTION

BACKGROUND

Storage systems include storage processors coupled to arrays of storage drives, such as solid state drives (SSDs) and hard disk drives (HDDs). The storage processors receive and service storage input/output (IO) requests (e.g., write requests, read requests) from storage client computers ("storage clients"), which send the storage IO requests to the storage systems over a network. The storage IO requests specify data blocks, data pages, data files, or other data elements to be written to or read from logical units (LUs), volumes (VOLs), filesystems, or other storage objects maintained on storage drives in a backend of the storage systems. The storage systems perform data reduction processes, including data deduplication processes ("dedupe processes") and data compression processes. The dedupe processes include those that operate on data blocks (or pages) aligned to native block (or page) boundaries ("aligned dedupe"), as well as those that operate on data blocks (or pages) unaligned to native block (or page) boundaries ("unaligned dedupe"). By performing such data reduction processes, storage systems may realize reductions in the amount and/or size of data needed to be stored in the backend, more efficient data transfers during backup and recovery operations, and so on.

SUMMARY

Storage system operation can involve processing data ingest flows ("ingest flows") from storage clients, as well as data flush flows ("flush flows") to target storage objects. During ingest flow processing, data elements (e.g., pages) can be received and stored in a cache (or staging) area, and acknowledgments of the received pages can be sent to the storage clients. During flush flow processing, the received pages can be collected from the staging area, metadata can be created to map logical addresses of the received pages to physical drive locations of the target storage objects, and the received pages can be flushed to the physical drive locations. Data reduction processes (e.g., dedupe processes, data compression processes) can be performed during the limited flush time ("in-line"), near in-line, or as part of background processing. Regarding dedupe processing, it would be desirable to have all available dedupe techniques at our disposal, from basic aligned dedupe techniques to unaligned dedupe techniques and other more advanced dedupe techniques, to assure that optimal levels of data reduction are achieved. Unfortunately, however, advanced dedupe techniques, such as unaligned dedupe techniques, can add unwanted overhead to storage systems (e.g., increased central processing unit (CPU) cycles, increased memory usage), whether performed in-line, near in-line, or in the background, thereby limiting their general application and use.

Techniques are disclosed herein for providing improved advanced deduplication efficiency by candidate sequence selection. The disclosed techniques can be performed along with basic dedupe techniques (e.g., aligned dedupe techniques), either in-line, near in-line, or in the background, based on available time and/or resources, data reduction ratio (DRR) targets, maximum acceptable overhead/penalties, and so on. The disclosed techniques can be performed to improve the efficiency of unaligned dedupe processes. For example, a storage system may receive, from a storage client, multiple write requests for writing, into a data cache, a plurality of pages, which may not be aligned to native page boundaries (e.g., 4 kilobyte (KB), 8 KB page boundaries) of the storage system. In one embodiment, to determine an unaligned offset of the plurality of pages from the native page boundaries, the storage system can access a respective page from among the plurality of pages, select a purportedly unique portion (e.g., 512 bytes (B)) of the respective page, generate a content-based signature or digest (e.g., hash value; MD5, SHA-1, SHA-2) of the page portion, and perform a search or lookup into a dedupe index to identify a digest of a sector (e.g., 512 bytes (B)) that matches the generated digest. Having identified a matching digest of a sector of a stored ("target") page, the storage system can check, against other such portions of the respective page, additional sectors of the target page, as well as sectors of a preceding or succeeding adjacent sequential target page, to establish an unaligned page match between the respective page and sectors of the target page and the preceding or succeeding adjacent sequential target page. The storage system can determine the unaligned offset of the plurality of pages from the native page boundaries in relation to the unaligned page match. When performing an unaligned dedupe process on a candidate sequence of pages from among the plurality of pages, the storage system can generate digests of the pages included in the candidate sequence, taking into account the unaligned offset.

To reduce unwanted overhead in performing unaligned dedupe processes, the disclosed techniques can prioritize deduplication of candidate sequences that satisfy certain deduplication ("dedupe") criteria, such as having at least a predetermined minimum sequence length (e.g., in terms of a number of pages), and including at least one page with an associated de-duplicability hint ("dedupe hint"), indicating that the page may include data duplicative or similar to data included in a target page. The disclosed techniques can include generating a score for each candidate sequence based at least on a number of dedupe hints associated with pages included in the candidate sequence. The disclosed techniques can include performing an unaligned dedupe process on one or more candidate sequences having the highest or higher generated scores, thereby increasing the chances of finding unaligned sequence (or page) matches between the candidate sequences and possible matching target sequences. The dedupe criteria can be expanded or modified to include a bias toward longer (e.g., in terms of a number of pages) possible matching target sequences, a compressibility of each page included in a possible matching target sequence, and/or any other suitable dedupe criterion. The disclosed techniques can include obtaining a correlation function between an average score of several representative candidate sequences and a corresponding average DRR gain, predicting, using the correlation function, an expected DRR gain based on a score generated for a candidate sequence, and performing an unaligned dedupe process on the candidate sequence based on whether the generated score and the expected DRR gain exceed predetermined minimum thresholds. By prioritizing deduplication of candidate sequences based on certain dedupe criteria and/or expected DRR gains, while deferring or avoiding deduplication of other page sequences not so prioritized, significant reductions in unwanted overhead in performing advanced dedupe techniques (e.g., reduced CPU cycles, reduced memory usage) can be achieved.

In certain embodiments, a method includes selecting, from among a plurality of unaligned data elements, two or more candidate sequences of unaligned data elements. The plurality of unaligned data elements are unaligned to native page boundaries of a storage system. Each candidate sequence satisfies predetermined deduplication criteria ("dedupe criteria") that includes a minimum candidate sequence length. The method includes obtaining a de-duplicability hint ("dedupe hint") for at least one unaligned data element in at least one of the two or more candidate sequences. The dedupe hint indicates that the at least one unaligned data element may be deduplicated based on at least one target data element. The method includes, for a respective candidate sequence from among the two or more candidate sequences that has the most dedupe hints, deduplicating the respective candidate sequence based on a target sequence that includes the at least one target data element.

In certain arrangements, the method includes deferring deduplicating at least one candidate sequence from among the two or more candidate sequences in response to the at least one candidate sequence having fewer dedupe hints than the respective candidate sequence.

In certain arrangements, the plurality of unaligned data elements have sequential logical addresses, respectively. The method includes selecting the two or more candidate sequences based at least on the sequential logical addresses of the plurality of unaligned data elements.

In certain arrangements, the method includes generating a score for each candidate sequence from among the two or more candidate sequences based at least on an amount of dedupe hints associated with the candidate sequence.

In certain arrangements, the method includes determining that the score generated for the respective candidate sequence reaches a predetermined minimum score threshold, and deduplicating the respective candidate sequence in response to the score reaching the predetermined minimum score threshold.

In certain arrangements, the method includes deferring deduplicating at least one candidate sequence from among the two or more candidate sequences in response to the score generated for the at least one candidate sequence failing to reach the predetermined minimum score threshold.

In certain arrangements, the method includes obtaining a correlation function that takes the score generated for each candidate sequence as input, and produces an expected data reduction ratio (DRR) gain as output.

In certain arrangements, the method includes deduplicating the respective candidate sequence in response to the expected DRR gain exceeding a predetermined minimum DRR gain threshold.

In certain embodiments, a system includes a memory, and processing circuitry configured to execute program instructions out of the memory to select, from among a plurality of unaligned data elements, two or more candidate sequences of unaligned data elements. The plurality of unaligned data elements are unaligned to native page boundaries of a storage system. Each candidate sequence satisfies predetermined deduplication criteria ("dedupe criteria") that includes a minimum candidate sequence length. The processing circuitry is configured to execute the program instructions out of the memory to obtain a de-duplicability hint ("dedupe hint") for at least one unaligned data element in at least one of the two or more candidate sequences. The dedupe hint indicates that the at least one unaligned data element may be deduplicated based on at least one target data element. The processing circuitry is configured to execute the program instructions out of the memory, for a respective candidate sequence from among the two or more candidate sequences that has the most dedupe hints, to deduplicate the respective candidate sequence based on a target sequence that includes the at least one target data element.

In certain arrangements, the processing circuitry is configured to execute the program instructions out of the memory to defer deduplicating at least one candidate sequence from among the two or more candidate sequences in response to the at least one candidate sequence having fewer dedupe hints than the respective candidate sequence.

In certain arrangements, the plurality of unaligned data elements have sequential logical addresses, respectively. The processing circuitry is configured to execute the program instructions out of the memory to select the two or more candidate sequences based at least on the sequential logical addresses of the plurality of unaligned data elements.

In certain arrangements, the processing circuitry is configured to execute the program instructions out of the memory to generate a score for each candidate sequence from among the two or more candidate sequences based at least on an amount of dedupe hints associated with the candidate sequence.

In certain arrangements, the processing circuitry is configured to execute the program instructions out of the memory to determine that the score generated for the respective candidate sequence reaches a predetermined minimum score threshold, and to deduplicate the respective candidate sequence in response to the score reaching the predetermined minimum score threshold.

In certain arrangements, the processing circuitry is configured to execute the program instructions out of the memory to defer deduplicating at least one candidate sequence from among the two or more candidate sequences in response to the score generated for the at least one candidate sequence failing to reach the predetermined minimum score threshold.

In certain arrangements, the processing circuitry is configured to execute the program instructions out of the memory to obtain a correlation function that takes the score generated for each candidate sequence as input, and produces an expected data reduction ratio (DRR) gain as output.

In certain arrangements, the processing circuitry is configured to execute the program instructions out of the memory to deduplicate the respective candidate sequence in response to the expected DRR gain exceeding a predetermined minimum DRR gain threshold.

In certain arrangements, the dedupe criteria includes an average compression ratio across target data elements of a possible target sequence being at least a desired ratio or percentage.

In certain arrangements, the dedupe criteria includes a bias toward longer possible target sequences.

In certain embodiments, a computer program product includes a set of non-transitory, computer-readable media having program instructions that, when executed by processing circuitry, cause the processing circuitry to perform a method including selecting, from among a plurality of unaligned data elements, two or more candidate sequences of unaligned data elements. The plurality of unaligned data elements are unaligned to native page boundaries of a storage system. Each candidate sequence satisfies predetermined deduplication criteria ("dedupe criteria") that includes a minimum candidate sequence length. The method includes obtaining a de-duplicability hint ("dedupe hint") for at least one unaligned data element in at least one of the two or more candidate sequences. The dedupe hint indicates that the at least one unaligned data element may be deduplicated based on at least one target data element. The method includes, for a respective candidate sequence from among the two or more candidate sequences that has the most dedupe hints, deduplicating the respective candidate sequence based on a target sequence that includes the at least one target data element.

Other features, functions, and aspects of the present disclosure will be evident from the Detailed Description that follows.

BRIEF DESCRIPTION OF THE DRAWINGS

The foregoing and other objects, features, and advantages will be apparent from the following description of particular embodiments of the present disclosure, as illustrated in the accompanying drawings, in which like reference characters refer to the same parts throughout the different views.

DETAILED DESCRIPTION

Techniques are disclosed herein for providing improved advanced deduplication efficiency by candidate sequence selection. The disclosed techniques can include generating a score for each candidate sequence from among a plurality of candidate sequences based at least on a number of deduplicability hints ("dedupe hints") associated with data elements (e.g., pages) included in the candidate sequence. The disclosed techniques can include performing an unaligned dedupe process on one or more of the plurality of candidate sequences having the highest or higher generated scores. The dedupe criteria can be expanded or modified to include a bias toward longer (e.g., in terms of a number of pages) possible matching target sequences, a compressibility of each page in a possible matching target sequence, and/or any other suitable dedupe criterion. The disclosed techniques can include obtaining a correlation function between an average score of several representative candidate sequences and a corresponding average data reduction ratio (DRR) gain, predicting, using the correlation function, an expected DRR gain based on a score generated for a candidate sequence, and performing an unaligned dedupe process on the candidate sequence based on whether the generated score and the expected DRR gain exceed predetermined minimum thresholds. By prioritizing deduplication of candidate sequences based on certain dedupe criteria and/or expected DRR gains, while deferring or avoiding deduplication of other page sequences not so prioritized, significant reductions in unwanted overhead in performing advanced dedupe techniques (e.g., reduced CPU cycles, reduced memory usage) can be achieved.

Figure 1:
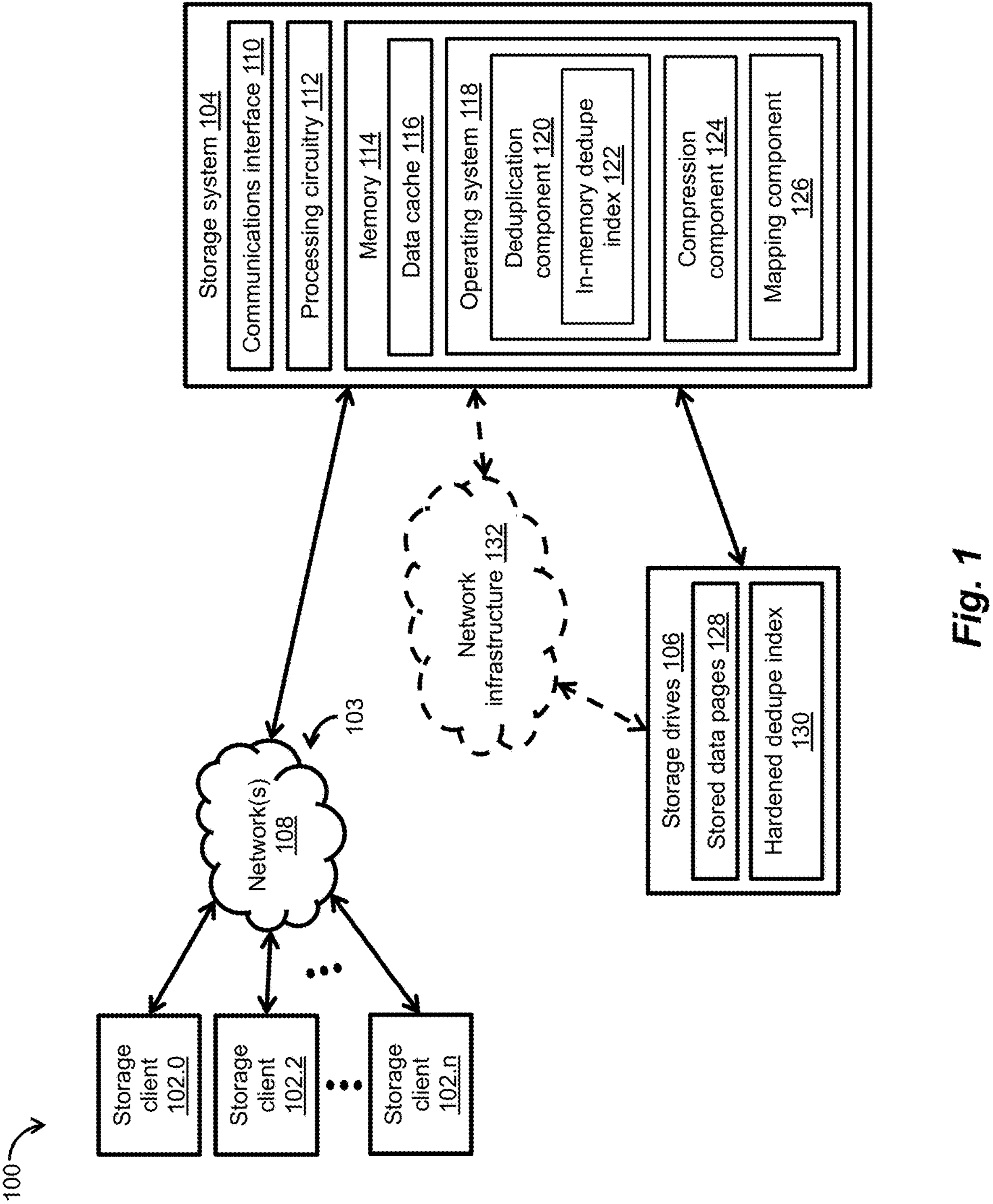
FIG. 1 is a block diagram of an exemplary storage environment, in which techniques can be practiced for providing improved advanced deduplication efficiency by candidate sequence selection.

FIG. 1 depicts an illustrative embodiment of an exemplary storage environment 100 for providing improved advanced deduplication efficiency by candidate sequence selection. As shown in FIG. 1, the storage environment 100 can include a plurality of storage client computers ("storage clients") 102.1, 102.2, . . . , 102.*n*, a storage system 104, storage drives 106, and a communications medium 103 that includes at least one network 108. Each storage client 102.1, . . . , 102.*n* can provide, over the network(s) 108, storage input/output (IO) requests (e.g., small computer system interface (SCSI) commands, network file system (NFS) commands) to the storage system 104. Such storage IO requests (e.g., write requests, read requests) can direct the storage system 104 to write or read data blocks, data pages, data files, or any other suitable data elements to/from logical units (LUs), volumes (VOLs), virtual volumes (VVOLs) (e.g., VMware® VVOLs), filesystems, or any other suitable storage objects maintained on the storage drives 106 (e.g., solid state drives (SSDs), hard disk drives (HDDs), flash drives).

The communications medium 103 can be configured to interconnect the plurality of storage clients 102.1, . . . , 102.*n* with the storage system 104, enabling them to communicate and exchange data and control signaling. As shown in FIG. 1, the communications medium 103 can be illustrated as a cloud to represent different network topologies, such as a storage area network (SAN) topology, a network attached storage (NAS) topology, a local area network (LAN) topology, a metropolitan area network (MAN) topology, a wide area network (WAN) topology, and so on. As such, the communications medium 103 can include copper-based communications devices and cabling, fiber optic devices and cabling, wireless devices, and so on, or any suitable combination thereof.

The storage system 104 can be connected directly to the storage drives 106, or indirectly through an optional network infrastructure 132, which can include an Ethernet network, an InfiniBand network, a Fibre Channel (FC) network, or any other suitable network. As shown in FIG. 1, the storage system 104 can include a communications interface 110, processing circuitry 112, and a memory 114. The communications interface 110 can include an Ethernet interface, an InfiniBand interface, an FC interface, or any other suitable communications interface. The communications interface 110 can further include SCSI target adapters, network interface adapters, or any other suitable adapters, for converting electronic, optical, or wireless signals received over the network(s) 108 to a form suitable for use by the processing circuitry 112. The processing circuitry 112 (e.g., central processing unit (CPU)) can include a set of processing cores (e.g., CPU cores) configured to execute specialized code, modules, and/or logic as program instructions out of the memory 114, process storage IO requests (e.g., write requests, read requests) issued by the storage clients 102.1, . . . , 102.*n*, and store data elements (e.g., pages) on the storage drives 106 within the storage environment 100, which can be a RAID (Redundant Array of Independent Disks) environment.

The memory 114 can include volatile memory, such as random access memory (RAM) or any other suitable volatile memory, and nonvolatile memory, such as nonvolatile RAM (NVRAM) or any other suitable nonvolatile memory. As shown in FIG. 1, the memory 114 can include a data cache memory ("data cache") 116. The memory 114 can accommodate an operating system (OS) 118, such as a Linux OS, Unix OS, Windows OS, or any other suitable OS, as well as specialized software/firmware code, logic, and/or modules, including a data deduplication component ("deduplication component") 120, a data compression component ("compression component") 124, and a mapping component 126. The deduplication component 120 can operate on received pages in association with an in-memory deduplication index ("dedupe index") 122. The storage drives 106 can maintain stored data pages 128, and a hardened dedupe index 130.

The storage system 104 can process data ingest flows ("ingest flows") from the storage clients 102.0, . . . , 102.*n*, and data flush flows ("flush flows") to target storage objects on the storage drives 106. During ingest flow processing, the processing circuitry 112 can receive and store pages into the data cache 116, which can serve as a staging area, and send acknowledgments of the received pages to the storage clients 102.0, . . . , 102.*n*. During flush flow processing, the processing circuitry 112 can collect the pages from the staging area of the data cache 116, and execute the deduplication component 120 to (i) apply a hash function to each page to generate a full page hash value, and (ii) perform a search or lookup into the in-memory dedupe index 122 to identify a hash value that matches the generated hash value, if any. If a matching hash value is not identified, then the processing circuitry 112 can execute the mapping component 126 to create metadata for mapping a logical address (e.g., logical block address (LBA)) of the received ("unique") page to a physical location on the storage drives 106. If a matching hash value is identified, then the processing circuitry 112 can execute the deduplication component 120 to effectuate storage of the received page using a logical address (e.g., LBA) of a stored ("target") page that corresponds to the matching hash value, thereby avoiding redundant storage of duplicate pages in the storage system 104.

It is noted that, once the in-memory dedupe index 122 has reached a specified fullness threshold, "dirty" index entries (i.e., index entries not yet persisted to nonvolatile storage) can be destaged from the in-memory dedupe index 122 to the hardened dedupe index 130, merged with other index entries of the hardened dedupe index 130, and deleted or removed from the in-memory dedupe index 122. It is further noted that, having executed the deduplication component 120 to eliminate page redundancy, the processing circuitry 112 can execute the compression component 124 to reduce the size of the unique pages before storing them among the stored data pages 128 on the storage drives 106.

Figures 2A, 2B, 2C:
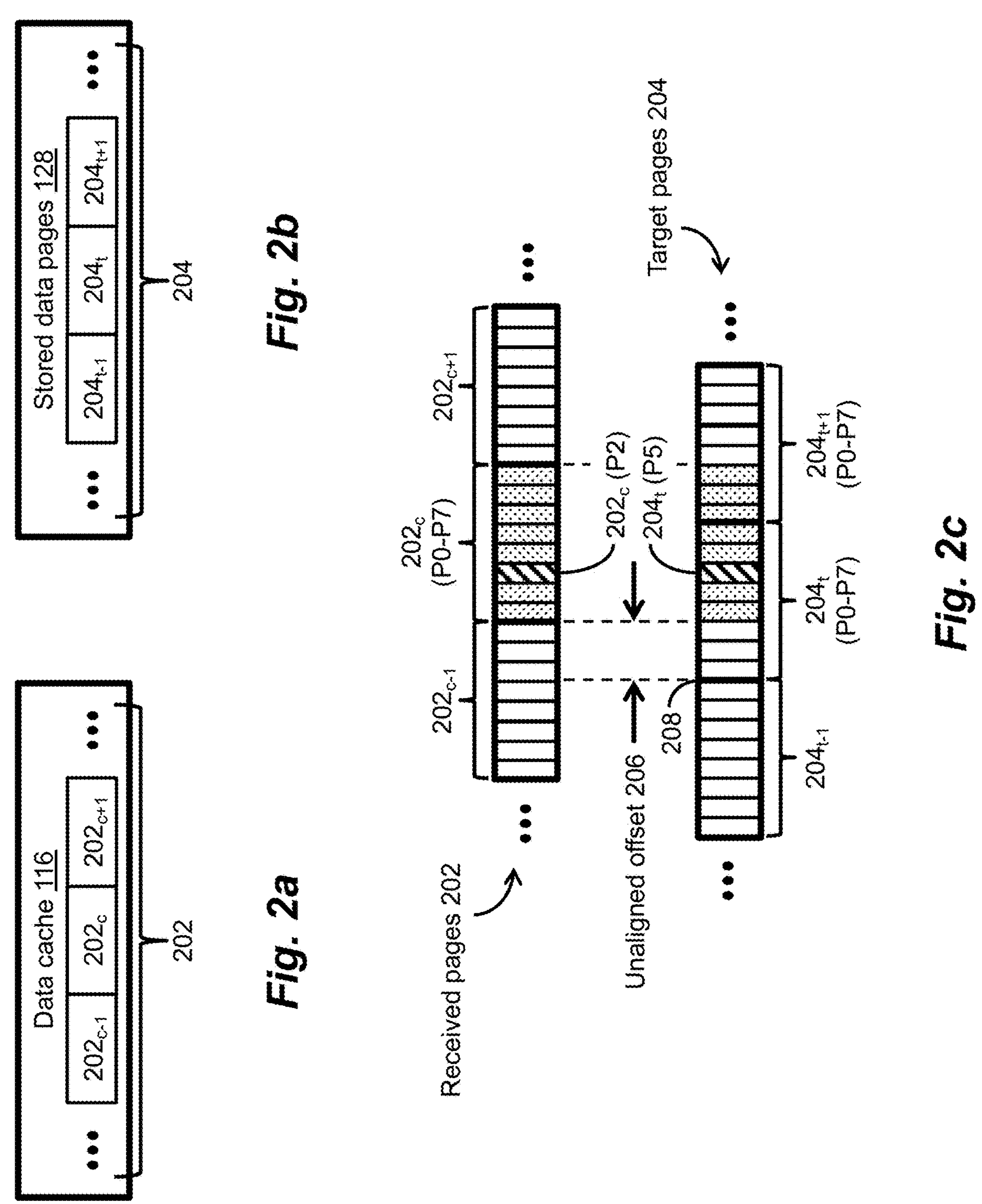
FIG. 2*a* is a block diagram of an exemplary data cache, which can be included in a storage system within the storage environment of FIG. 1.
FIG. 2*b* is a block diagram of exemplary stored data pages ("pages"), which can be maintained on a storage drive(s) within the storage environment of FIG. 1.
FIG. 2*c* is a block diagram of an exemplary candidate sequence of pages from the data cache of FIG. 2*a*, and an exemplary target sequence of pages maintained on the storage drive(s) of FIG. 2*b*, in which the pages included in the candidate sequence are unaligned to native page boundaries of the storage system.

During operation, the disclosed techniques can be performed to improve the efficiency of unaligned dedupe processes. For example, the storage system 104 may receive, from one of the storage clients 102.0, . . . , 102.*n*, multiple write requests for writing, into the data cache 116, a plurality of pages, . . . $\mathbf{202}_{c-1}$, $\mathbf{202}_c$, $\mathbf{202}_{c+1}$, . . . (see FIG. 2*a*), which may not be aligned to native page boundaries (e.g., 4 kilobyte (KB), 8 KB page boundaries) of the storage system 104. In one embodiment, to determine an unaligned offset (e.g., unaligned offset 206; see FIG. 2*c*) of the plurality of pages from native page boundaries (e.g., native page boundary 208; see FIG. 2*c*), the processing circuitry 112 can execute the deduplication component 120 to (i) select a purportedly unique portion $\mathbf{202}_c$ (P2) (e.g., 512 bytes (B)) of the page $\mathbf{202}_c$, (ii) generate a content-based signature or digest (e.g., hash value; MD5, SHA-1, SHA-2) of the page portion $\mathbf{202}_c$ (P2), and (iii) perform a search or lookup into the in-memory dedupe index 122 to identify a digest of a sector of a stored ("target") page that matches the digest of the page portion $\mathbf{202}_c$ (P2). Having identified a matching digest of a sector of one of a plurality of target pages, . . . $\mathbf{204}_{t-1}$, $\mathbf{204}_t$, $\mathbf{204}_{t+1}$, . . . (see FIG. 2*b*), namely, a sector $\mathbf{204}_t$ (P5) of the target page $\mathbf{204}_t$, the processing circuitry 112 can execute the deduplication component 120 to check, against the remaining portions $\mathbf{202}_c$ (P0, P1, P3-P7) of the page $\mathbf{202}_c$, additional sectors $\mathbf{202}_t$ (P3, P4, P6, P7) of the target page $\mathbf{204}_t$, as well as sectors $\mathbf{204}_{t+1}$ (P0, P1, P2) of the succeeding adjacent sequential target page $\mathbf{204}_{t+1}$, to establish an unaligned page match between the page $\mathbf{202}_c$ and sectors of the target page $\mathbf{204}_t$ (P3-P7) and the succeeding adjacent sequential target page $\mathbf{204}_{t+1}$ (P0-P2). The processing circuitry 112 can execute the deduplication component 120 to determine the unaligned offset 206 of the page $\mathbf{202}_c$ in relation to the unaligned page match. When performing an unaligned dedupe process on a candidate sequence of pages from among the plurality of pages, . . . $\mathbf{202}_{c-1}$, $\mathbf{202}_c$, $\mathbf{202}_{c+1}$, . . . , the processing circuitry 112 can execute the deduplication component 120 to generate digests (e.g., hash values) of the pages included in the candidate sequence, taking into account the unaligned offset 206. It is noted that, in the descriptions herein, the designations "P0", "P1", "P2", "P3", "P4", "P5", "P6", and "P7" correspond to page portion or sector positions within a received or target page. It is further noted that a purportedly unique page portion (e.g., page portion $\mathbf{202}_c$ (P2); see FIG. 2*c*) can be selected by executing a deterministic function (e.g., entropy function) on portions of a received page, and selecting the portion for which the deterministic function generates a maximum or minimum result.

During further operation, to reduce unwanted overhead in performing unaligned dedupe processes on candidate sequences, the disclosed techniques can prioritize deduplication of the candidate sequences that satisfy certain deduplication ("dedupe") criteria, such as having at least a predetermined minimum sequence length (e.g., in terms of a number of pages), and including at least one page with an associated de-duplicability hint ("dedupe hint"), indicating that the page may include data duplicative or similar to data included in a target page. The processing circuitry 112 can execute the deduplication component 120 to generate a score for each candidate sequence based at least on a number of dedupe hints associated with pages included in the candidate sequence. The processing circuitry 112 can execute the deduplication component 120 to perform an unaligned dedupe process on one or more candidate sequences having the highest or higher generated scores, thereby increasing the chances of finding unaligned sequence (or page) matches between the candidate sequences and possible matching target sequences. The dedupe criteria can be expanded or modified to include a bias toward longer (e.g., in terms of a number of pages) possible matching target sequences, a compressibility of each page included in a possible matching target sequence, and/or any other suitable dedupe criterion. The processing circuitry 112 can execute the deduplication component 120 to (i) obtain or determine a correlation function between an average score of several representative candidate sequences and a corresponding average data reduction ratio (DRR) gain, (ii) produce or predict, using the correlation function, an expected DRR gain based on a score generated for a candidate sequence, and (iii) perform an unaligned dedupe process on the candidate sequence based on whether the generated score and the expected DRR gain exceed predetermined minimum thresholds. By prioritizing deduplication of candidate sequences based on certain dedupe criteria and/or expected DRR gains, while deferring or avoiding deduplication of other page sequences not so prioritized, significant reductions in unwanted overhead in performing advanced dedupe techniques (e.g., reduced CPU cycles, reduced memory usage) can be achieved.

Figures 3A, 3B, 3C:
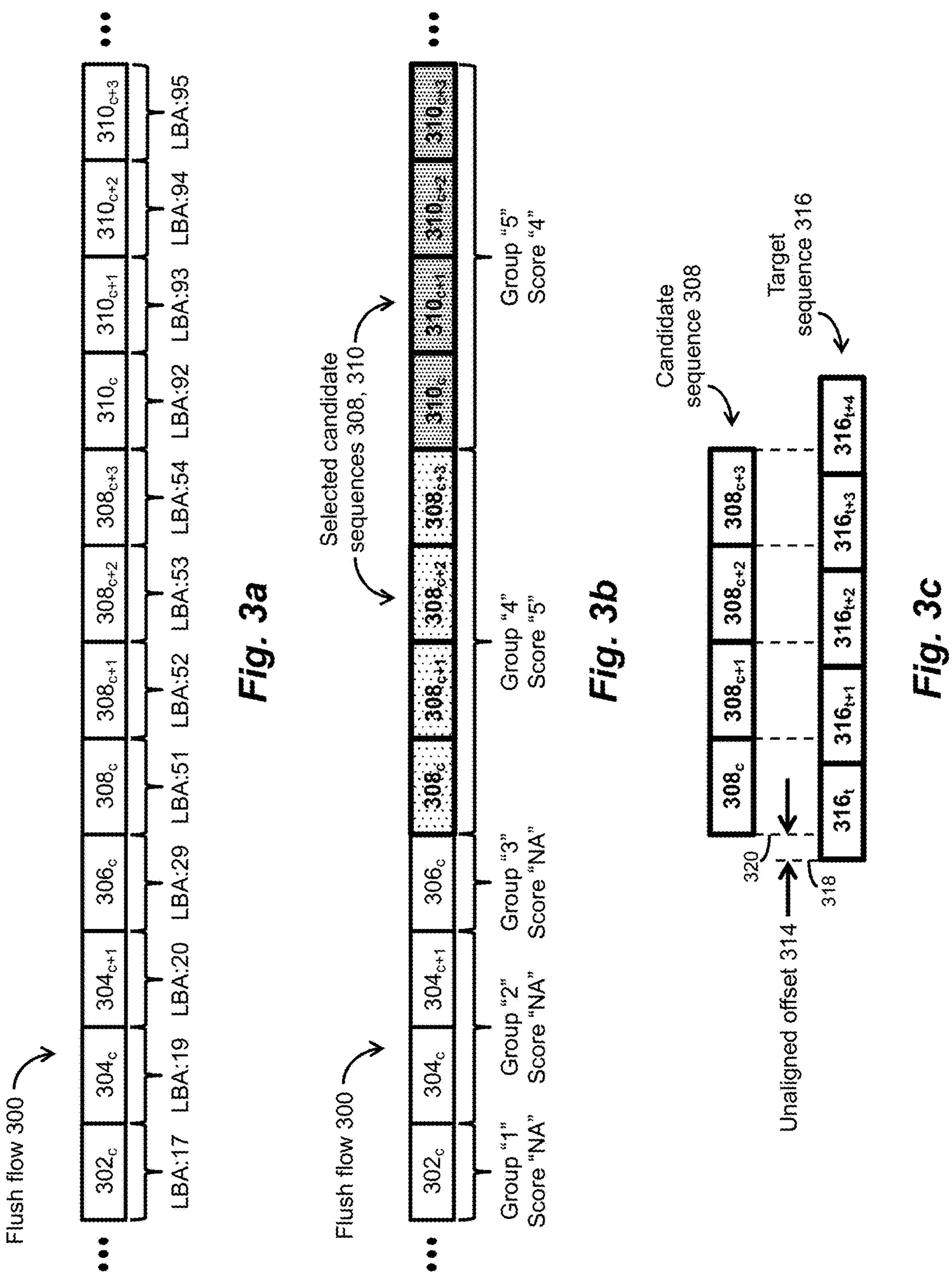
FIG. 3*a* is a block diagram of an exemplary flush flow of pages that includes a plurality of sequences of unaligned pages.
FIG. 3*b* is a block diagram of the flush flow of FIG. 3*a*, in which several candidate sequences have been selected.
FIG. 3*c* is a block diagram of a respective candidate sequence from among the selected candidate sequences of FIG. 3*b*, as well as a target sequence of pages for use in deduplicating the respective candidate sequence.

The disclosed techniques will be further understood with reference to the following illustrative example, and FIGS. 1 and 3*a*-3*c*. In this example, it is assumed that the storage system 104 (see FIG. 1) receives, from at least one of the storage clients 102.0, . . . , 102.*n*, multiple write requests for writing, into the data cache 116, a plurality of pages, . . . $\mathbf{302}_c$, $\mathbf{304}_c$, $\mathbf{304}_{c+1}$, $\mathbf{306}_c$, $\mathbf{308}_c$, $\mathbf{308}_{c+1}$, $\mathbf{308}_{c+2}$, $\mathbf{308}_{c+3}$, $\mathbf{310}_c$, $\mathbf{310}_{c+1}$, $\mathbf{310}_{c+2}$, $\mathbf{310}_{c+3}$ . . . (see FIG. 3*a*), which may not be aligned to native page boundaries (e.g., 4 KB, 8 KB page boundaries) of the storage system 104. In this example, an unaligned offset 314 (see FIG. 3*c*) of the plurality of pages, . . . $\mathbf{302}_c$, $\mathbf{304}_c$, $\mathbf{304}_{c+1}$, $\mathbf{306}_c$, $\mathbf{308}_c$, $\mathbf{308}_{c+1}$, $\mathbf{308}_{c+2}$, $\mathbf{308}_{c+3}$, $\mathbf{310}_c$, $\mathbf{310}_{c+1}$, $\mathbf{310}_{c+2}$, $\mathbf{310}_{c+3}$ . . . , can be determined using the approach described herein with reference to FIGS. 2*a*-2*c*, or any other suitable approach. FIG. 3*c* depicts the unaligned offset 314 in relation to a page boundary 318 of a stored ("target") page $\mathbf{316}_t$, and a page boundary 320 of the received page $\mathbf{308}_c$.

It is further assumed that the storage system 104 performs, during flush flow processing, an unaligned dedupe process on a flush flow 300 (see FIG. 3*a*) of the pages, . . . $\mathbf{302}_c$, $\mathbf{304}_c$, $\mathbf{304}_{c+1}$, $\mathbf{306}_c$, $\mathbf{308}_c$, $\mathbf{308}_{c+1}$, $\mathbf{308}_{c+2}$, $\mathbf{308}_{c+3}$, $\mathbf{310}_c$, $\mathbf{310}_{c+1}$, $\mathbf{310}_{c+2}$, $\mathbf{310}_{c+3}$ . . . . As shown in FIG. 3*a*, each page in the flush flow 300 has an associated logical address (e.g., logical block address (LBA)). For example, the page $\mathbf{302}_c$ may have an associated LBA, "17"; the page $\mathbf{304}_c$ may have an associated LBA, "19"; the page $\mathbf{304}_{c+1}$ may have an associated LBA, "20"; and the page $\mathbf{306}_c$ may have an associated LBA, "29". Further, the page $\mathbf{308}_c$ may have an associated LBA, "51"; the page $\mathbf{308}_{c+1}$ may have an associated LBA, "52"; the page $\mathbf{308}_{c+2}$ may have an associated LBA, "53"; and the page $\mathbf{308}_{c+3}$ may have an associated LBA, "54". In addition, the page $\mathbf{310}_c$ may have an associated LBA, "92"; the page $\mathbf{310}_{c+1}$ may have an associated LBA, "93"; the page $\mathbf{310}_{c+2}$ may have an associated LBA, "94"; and the page $\mathbf{310}_{c+3}$ may have an associated LBA, "95". It is noted that the LBAs described herein for the respective pages, $\mathbf{302}_c$, $\mathbf{304}_c$, $\mathbf{304}_{c+1}$, $\mathbf{306}_c$, $\mathbf{308}_c$, $\mathbf{308}_{c+1}$, $\mathbf{308}_{c+2}$, $\mathbf{308}_{c+3}$, $\mathbf{310}_c$, $\mathbf{310}_{c+1}$, $\mathbf{310}_{c+2}$, $\mathbf{310}_{c+3}$, are provided for purposes of illustration only, and that any other suitable LBAs may be employed.

In this example, the storage system 104 identifies a number of page sequences in the flush flow 300 based at least on the LBAs associated with the respective pages, . . . $\mathbf{302}_c$, $\mathbf{304}_c$, $\mathbf{304}_{c+1}$, $\mathbf{306}_c$, $\mathbf{308}_c$, $\mathbf{308}_{c+1}$, $\mathbf{308}_{c+2}$, $\mathbf{308}_{c+3}$, $\mathbf{310}_c$, $\mathbf{310}_{c+1}$, $\mathbf{310}_{c+2}$, $\mathbf{310}_{c+3}$ . . . , in which each page sequence includes one or more pages. For example, the page sequences in the flush flow 300 may be identified based on IO (e.g., write IO, read IO). In other words, for each identified page sequence, the pages may have been written together into the data cache 116, and may therefore be expected to be subsequently read together. As shown in FIG. 3*b*, at least five (5) page sequences are identified and designated, Group "1", Group "2", Group "3", Group "4", and Group "5". A first page sequence with the designation, Group "1", includes the single page $\mathbf{302}_c$ associated with the LBA "17", a second page sequence with the designation, Group "2", includes the two (2) pages $\mathbf{304}_c$ and $\mathbf{304}_{c+1}$ associated with the two (2) sequential LBAs "19" and "20", respectively, and a third page sequence with the designation, Group "3", includes the single page $\mathbf{306}_c$ associated with the LBA "29". In addition, a fourth page sequence with the designation, Group "4", includes the four (4) pages $\mathbf{308}_c$, $\mathbf{308}_{c+1}$, $\mathbf{308}_{c+2}$, and $\mathbf{308}_{c+3}$ associated with the four (4) sequential LBAs "51", "52", "53", and "54", respectively, and a fifth page sequence with the designation, Group "5", includes the four (4) pages $\mathbf{310}_c$, $\mathbf{310}_{c+1}$, $\mathbf{310}_{c+2}$, $\mathbf{310}_{c+3}$ associated with the four (4) sequential LBAs "92", "93", "94", and "95", respectively.

Further in this example, in the flush flow 300, the storage system 104 prioritizes deduplication of the five (5) page sequences designated Group "1" through Group "5" based on whether the page sequences satisfy certain dedupe criteria, such as having at least a predetermined minimum sequence length (e.g., at least four (4) pages), and including at least one page with an associated dedupe hint, indicating that the page may include data duplicative or similar to data included in a target page. There can be some correlation between the length of a page sequence and the number of dedupe hints for pages included in the page sequence. Further, as the number of dedupe hints for pages included in a page sequence increases, the chances of finding an unaligned sequence (or page) match between the candidate sequence and a possible matching target sequence (or page) can also increase. As shown in FIG. 3*b*, the page sequence designated Group "4" satisfies the dedupe criterion of having at least four (4) pages, namely, the four (4) pages $\mathbf{308}_c$, $\mathbf{308}_{c+1}$, $\mathbf{308}_{c+2}$, and $\mathbf{308}_{c+3}$. Likewise, the page sequence designated Group "5" satisfies the dedupe criterion of having at least four (4) pages, namely, the four (4) pages $\mathbf{310}_c$, $\mathbf{310}_{c+1}$, $\mathbf{310}_{c+2}$, and $\mathbf{310}_{c+3}$. In this example, because each of the page sequences designated Group "1", Group "2", and Group "3" have less than four (4) pages, these three (3) page sequences are not prioritized for deduplication, and may (or may not) be deduplicated later (e.g., in the background), thereby reducing unwanted overhead in performing unaligned dedupe processes (e.g., reduced CPU cycles, reduced memory usage).

As further shown in FIG. 3*b*, in the flush flow 300, each of the five (5) page sequences designated Group "1" through Group "5" have a corresponding score based at least on the number of dedupe hints associated with pages included in the page sequence. For example, the page sequence designated Group "4", including the four (4) pages $\mathbf{308}_c$, $\mathbf{308}_{c+1}$, $\mathbf{308}_{c+2}$, and $\mathbf{308}_{c+3}$, may have a corresponding score, "5", and the page sequence designated Group "5", including the four (4) pages $\mathbf{310}_c$, $\mathbf{310}_{c+1}$, $\mathbf{310}_{c+2}$, and $\mathbf{310}_{c+3}$, may have a corresponding score, "4". Further, each of the page sequences designated Group "1", Group "2", and Group "3", may have a corresponding score, "NA", indicating that those page sequences fail to meet a minimum level of dedupe criteria, such as having at least a predetermined minimum sequence length (e.g., at least four (4) pages). It is noted that digests (e.g., hash values) of the pages included in the page sequences designated Group "4" and Group "5" can be generated, taking into account the unaligned offset (e.g., unaligned offset 314; see FIG. 3*c*), and a dedupe hint for each page can be determined based on whether its generated digest matches or is similar to any digest (e.g., hash value) stored in the in-memory or hardened dedupe index 122, 130. It is further noted that the score values or designations described herein for the respective page sequences are provided for purposes of illustration only, and that any other suitable scores or designations may be employed based on historical data patterns or any other suitable criteria.

Because the page sequence designated Group "4" and the page sequence designated Group "5" each meet the minimum level of dedupe criteria, such as having at least the predetermined minimum sequence length of four (4) pages, the page sequences designated Group "4" and Group "5" are selected as possible candidate sequences 308, 310 for the unaligned dedupe process. In this example, however, the unaligned dedupe process is ultimately performed on candidate sequences whose scores reach at least a predetermined minimum score threshold (e.g., at least five (5)). As described herein, the page sequence designated Group "4" may have a corresponding score, "5", and the page sequence designated Group "5" may have a corresponding score, "4". As such, the candidate sequence 308 may be deemed the best or better candidate for successful deduplication. Accordingly, the unaligned dedupe process may be performed on the candidate sequence 308, while deduplication of the candidate sequence 310 may be deferred or avoided, thereby further reducing unwanted overhead in performing unaligned dedupe processes (e.g., reduced CPU cycles, reduced memory usage).

In this example, the storage system 104 performs the unaligned dedupe process on the flush flow 300 (see FIG. 3*a*), prioritizing deduplication of the candidate sequence 308. While performing the unaligned dedupe process, unaligned page matches are established, taking into account the unaligned offset 314, between one or more of the pages $\mathbf{308}_c$, $\mathbf{308}_{c+1}$, $\mathbf{308}_{c+2}$, $\mathbf{308}_{c+3}$ of the candidate sequence 308 and portions of pages of a stored ("target") sequence 316, which includes at least five (5) target pages $\mathbf{316}_t$, $\mathbf{316}_{t+1}$, $\mathbf{316}_{t+2}$, $\mathbf{316}_{t+3}$, $\mathbf{316}_{t+4}$. In this example, the unaligned page matches (indicated by dashed lines; see FIG. 3*c*) are established between (i) the received page $\mathbf{308}_c$ and portions of the target page $\mathbf{316}_t$ and the succeeding adjacent sequential target page $\mathbf{316}_{t+1}$, (ii) the received page $\mathbf{308}_{c+1}$ and portions of the target page $\mathbf{316}_{t+1}$ and the succeeding adjacent sequential target page $\mathbf{316}_{t+2}$, (iii) the received page $\mathbf{308}_{c+2}$ and portions of the target page $\mathbf{316}_{t+2}$ and the succeeding adjacent sequential target page $\mathbf{316}_{t+3}$, and (iv) the received page $\mathbf{308}_{c+3}$ and portions of the target page $\mathbf{316}_{t+3}$ and the succeeding adjacent sequential target page $\mathbf{316}_{t+4}$. Having established the unaligned page matches between the pages of the candidate sequence 308 and the pages of the target sequence 316, the page $\mathbf{308}_c$ of the candidate sequence 308 can be effectively stored among the stored data pages 128 (see FIG. 1) using a first pointer to the target page $\mathbf{316}_t$, and a second pointer to the succeeding adjacent sequential target page $\mathbf{316}_{t+1}$, in which the first pointer identifies or points to the appropriate sectors of the target page $\mathbf{316}_t$, and the second pointer identifies or points to the appropriate sectors of the succeeding adjacent sequential target page $\mathbf{316}_{t+1}$. The remaining pages $\mathbf{308}_{c+1}$, $\mathbf{308}_{c+2}$, $\mathbf{308}_{c+3}$ of the candidate sequence 308 can be effectively stored in likewise fashion.

Figure 4:
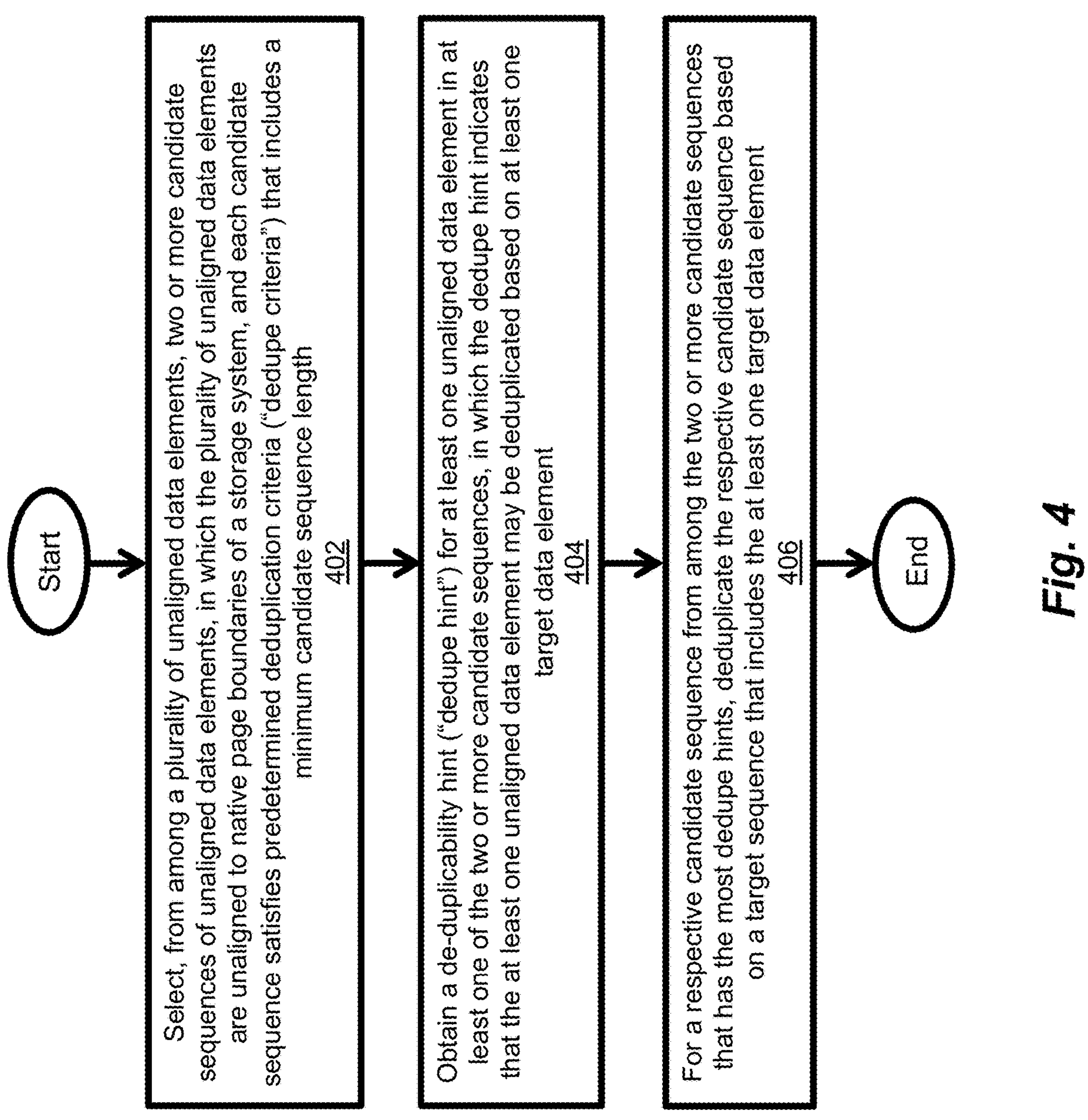
FIG. 4 is a flow diagram of an exemplary method of providing improved advanced deduplication efficiency by candidate sequence selection.

A method of improving deduplication efficiency by candidate sequence selection is described herein with reference to FIG. 4. As depicted in block 402, two or more candidate sequences of unaligned data elements are selected from among a plurality of unaligned data elements, in which the plurality of unaligned data elements are unaligned to native page boundaries of a storage system, and each candidate sequence satisfies predetermined deduplication criteria ("dedupe criteria") that includes a minimum candidate sequence length. As depicted in block 404, a de-duplicability hint ("dedupe hint") is obtained for at least one unaligned data element in at least one of the two or more candidate sequences, in which the dedupe hint indicates that the at least one unaligned data element may be deduplicated based on at least one target data element. As depicted in block 406, for a respective candidate sequence from among the two or more candidate sequences that has the most dedupe hints, the respective candidate sequence is deduplicated based on a target sequence that includes the at least one target data element.

Having described the above illustrative embodiments, various alternative embodiments and/or variations may be made and/or practiced. For example, with reference to an illustrative example, it was described herein that an unaligned dedupe process may be performed on one candidate sequence, while deduplication of another candidate sequence may be deferred or avoided due to its score failing to reach a predetermined minimum score threshold. In one embodiment, deduplication of unaligned page sequences that fail to reach a predetermined minimum score threshold can be deferred as background processing, and ultimately handled (or dropped) based on availability of time and/or resources, with an eye toward avoiding high debt situations and/or providing DRR gains within reasonable time periods.

It was further described herein, with reference to the illustrative example, that deduplication of unaligned page sequences may be prioritized and scored based on whether certain dedupe criteria are met or satisfied, such as having at least a predetermined minimum sequence length, and including at least one page with an associated dedupe hint. In one embodiment, such dedupe criteria can be expanded or modified to include a compressibility of each page included in a possible matching sequence, a bias toward longer (e.g., in terms of a number of pages) possible matching sequences, and/or any other suitable dedupe criterion. For example, deduplication of an unaligned page sequence may be deferred or avoided if an average compression ratio across pages of a possible matching sequence is determined to be at least a desired ratio or percentage (e.g., at least 25%). Further, favoring longer possible matching sequences may increase the chances of successful deduplication of unaligned page sequences. In one embodiment, scores can be generated for some or all such unaligned page sequences whether or not certain minimum dedupe criteria are strictly met. For example, higher scores may be generated for unaligned page sequences that have at least the predetermined minimum sequence length and/or include the most or more pages with associated dedupe hints, and lower scores may be generated for unaligned page sequences that have less than the predetermined minimum sequence length and/or include the fewest, fewer, or no pages with associated dedupe hints. Further, some or all such unaligned page sequences can be sorted in a specified order by the generated scores, and processed for possible deduplication in the specified order until a timeout is reached.

It was further described herein, with reference to the illustrative example, that one or more unaligned page sequences may be prioritized for deduplication due to satisfying a dedupe criterion of having at least a predetermined minimum sequence length, while other unaligned page sequences may not be prioritized for deduplication due to having less than the predetermined minimum sequence length. In one embodiment, shorter page sequences can be merged with other shorter and/or longer page sequences to further increase the chances of successful deduplication of unaligned page sequences.

It was further described herein that a content-based signature or digest (e.g., hash value; MD5, SHA-1, SHA-2) of a page may be generated, and a search or lookup into a dedupe index may be performed to identify a signature or digest of a stored page that matches the generated signature or digest. In one embodiment, any suitable unaligned signature can be generated for a page. For example, such an unaligned signature may be content-aligned, in which the offset (i.e., any offset) is defined by the content of a page, or sector-aligned, in which the offset is set to a sector (i.e., some multiple of 512 B) of the page. It is noted that any other suitable technique for generating an unaligned signature of a page may be employed.

It was further described herein that (i) a correlation function may be determined between an average score of several representative unaligned page sequences and a corresponding average data reduction ratio (DRR) gain, (ii) an expected DRR gain may be produced or predicted, using the correlation function, based on a score ("sequence score") generated for an unaligned page sequence, and (iii) an unaligned dedupe process may be performed on the unaligned page sequence based on whether the generated sequence score and the expected DRR gain exceed predetermined minimum thresholds. For example, a predetermined minimum threshold for a generated sequence score may be "4" or any other suitable value. Further, a predetermined minimum threshold for an expected DRR gain may be "4:1" or any other suitable ratio. As set forth below, an exemplary process that employs such a correlation function can be expressed, as follows:

- Determine (i) a minimum threshold, $S_{min}$, for scores of unaligned page sequences ("candidate sequences"), and (ii) a minimum threshold, $G_{min}$, for expected DRR gains;
- Determine a correlation function (F(s)=g) that takes a score, s, of a candidate sequence as input, and produces or predicts an expected DRR gain, g, as output;
- For each of several candidate sequences:
  - Determine a length of the candidate sequence;
  - Determine a number of dedupe hints for pages included in the candidate sequence;
  - Determine a length of a possible matching sequence ("target sequence");
  - Determine an average compressibility of pages included in the target sequence; and
  - Generate the score, s, for the candidate sequence based at least on the length of the candidate sequence, the number of dedupe hints for pages included in the candidate sequence, the length of the target sequence, and/or the average compressibility of pages included in the target sequence;
- Sort the candidate sequences in descending order by the generated scores;
- For each candidate sequence in the sorted order:
  - If the generated score, s, is greater than $S_{min}$, and the predicted expected DRR gain, g, determined using the correlation function, F(s)=g, is greater than $G_{min}$, then perform an unaligned dedupe process on the candidate sequence;
  - Otherwise, avoid performing the unaligned dedupe process on the candidate sequence; and
- Refine the correlation function to improve an accuracy of correlation between the generated scores, s, and the expected DRR gains, g.

Several definitions of terms are provided below for the purpose of aiding the understanding of the foregoing description, as well as the claims set forth herein.

As employed herein, the term "storage system" is intended to be broadly construed to encompass, for example, private or public cloud computing systems for storing data, as well as systems for storing data comprising virtual infrastructure and those not comprising virtual infrastructure.

As employed herein, the terms "client", "host", and "user" refer, interchangeably, to any person, system, or other entity that uses a storage system to read/write data.

As employed herein, the term "storage device" may refer to a storage array including multiple storage devices. Such storage devices may refer to any non-volatile memory (NVM) devices, including hard disk drives (HDDs), solid state drives (SSDs), flash devices (e.g., NAND flash devices, NOR flash devices), and/or similar devices that may be accessed locally and/or remotely, such as via a storage area network (SAN).

As employed herein, the term "storage array" may refer to a storage system used for page-based, block-based, file-based, or other object-based storage. Such a storage array may include, for example, dedicated storage hardware containing HDDs, SSDs, and/or flash drives.

As employed herein, the term "storage entity" may refer to a filesystem, an object storage, a virtualized device, a logical unit (LU), a logical volume (LV), a logical device, a physical device, and/or a storage medium.

As employed herein, the term "LU" may refer to a logical entity provided by a storage system for accessing data from the storage system and may be used interchangeably with a logical volume (LV). The term "LU" may also refer to a logical unit number (LUN) for identifying a logical unit, a virtual disk, or a virtual LUN.

As employed herein, the term "physical storage unit" may refer to a physical entity such as a storage drive or disk or an array of storage drives or disks for storing data in storage locations accessible at addresses. The term "physical storage unit" may be used interchangeably with the term "physical volume".

As employed herein, the term "storage medium" may refer to a hard drive or flash storage, a combination of hard drives and flash storage, a combination of hard drives, flash storage, and other storage drives or devices, or any other suitable types and/or combinations of computer readable storage media. Such a storage medium may include physical and logical storage media, multiple levels of virtual-to-physical mappings, and/or disk images. The term "storage medium" may also refer to a computer-readable program medium.

As employed herein, the term "IO request" or "IO" may refer to a data input or output request such as a write request or a read request.

As employed herein, the terms, "such as", "for example", "e.g.", "exemplary", and variants thereof refer to non-limiting embodiments and have meanings of serving as examples, instances, or illustrations. Any embodiments described herein using such phrases and/or variants are not necessarily to be construed as preferred or more advantageous over other embodiments, and/or to exclude incorporation of features from other embodiments.

As employed herein, the term "optionally" has a meaning that a feature, element, process, etc., may be provided in certain embodiments and may not be provided in certain other embodiments. Any particular embodiment of the present disclosure may include a plurality of optional features unless such features conflict with one another.

While various embodiments of the present disclosure have been particularly shown and described, it will be understood by those skilled in the art that various changes in form and details may be made therein without departing from the scope of the present disclosure, as defined by the appended claims.

What is claimed is:

1. A method comprising:

selecting, from among a plurality of unaligned data elements, two or more candidate sequences of unaligned data elements, the plurality of unaligned data elements being unaligned to native page boundaries of a storage system, and each candidate sequence satisfying predetermined deduplication criteria that includes a minimum candidate sequence length;

obtaining a de-duplicability hint for at least one unaligned data element in at least one of the two or more candidate sequences, the de-duplicability hint indicating that the at least one unaligned data element may be deduplicated based on at least one target data element; and for a respective candidate sequence from among the two or more candidate sequences that has a highest number of de-duplicability hints, deduplicating the respective candidate sequence based on a target sequence that includes the at least one target data element.

2. The method of claim 1 comprising:

deferring deduplicating at least one candidate sequence from among the two or more candidate sequences in response to the at least one candidate sequence having fewer de-duplicability hints than the respective candidate sequence.

3. The method of claim 1 wherein the plurality of unaligned data elements have sequential logical addresses, respectively, and wherein the selecting of the two or more candidate sequences includes selecting the two or more candidate sequences based at least on the sequential logical addresses of the plurality of unaligned data elements.

4. The method of claim 1 comprising:

generating a score for each candidate sequence from among the two or more candidate sequences based at least on an amount of de-duplicability hints associated with the candidate sequence.

5. The method of claim 4 comprising:

determining that the score generated for the respective candidate sequence reaches a predetermined minimum score threshold; and wherein the deduplicating of the respective candidate sequence includes deduplicating the respective candidate sequence in response to the score reaching the predetermined minimum score threshold.

6. The method of claim 5 comprising:

deferring deduplicating at least one candidate sequence from among the two or more candidate sequences in response to the score generated for the at least one candidate sequence failing to reach the predetermined minimum score threshold.

7. The method of claim 4 comprising:

obtaining a correlation function that takes the score generated for each candidate sequence as input, and produces an expected data reduction ratio (DRR) gain as output.

8. The method of claim 7 wherein the deduplicating of the respective candidate sequence includes deduplicating the respective candidate sequence in response to the expected DRR gain exceeding a predetermined minimum DRR gain threshold.

9. A system comprising:

a memory; and processing circuitry configured to execute program instructions out of the memory to:

select, from among a plurality of unaligned data elements, two or more candidate sequences of unaligned data elements, wherein the plurality of unaligned data elements are unaligned to native page boundaries of a storage system, and wherein each candidate sequence satisfies predetermined deduplication criteria that includes a minimum candidate sequence length;

obtain a de-duplicability hint for at least one unaligned data element in at least one of the two or more candidate sequences, wherein the de-duplicability hint indicates that the at least one unaligned data element may be deduplicated based on at least one target data element; and for a respective candidate sequence from among the two or more candidate sequences that has a highest number of de-duplicability hints, deduplicate the respective candidate sequence based on a target sequence that includes the at least one target data element.

10. The system of claim 9 wherein the processing circuitry is configured to execute the program instructions out of the memory to defer deduplicating at least one candidate sequence from among the two or more candidate sequences in response to the at least one candidate sequence having fewer de-duplicability hints than the respective candidate sequence.

11. The system of claim 9 wherein the plurality of unaligned data elements have sequential logical addresses, respectively, and wherein the processing circuitry is configured to execute the program instructions out of the memory to select the two or more candidate sequences based at least on the sequential logical addresses of the plurality of unaligned data elements.

12. The system of claim 9 wherein the processing circuitry is configured to execute the program instructions out of the memory to generate a score for each candidate sequence from among the two or more candidate sequences based at least on an amount of de-duplicability hints associated with the candidate sequence.

13. The system of claim 12 wherein the processing circuitry is configured to execute the program instructions out of the memory to:

determine that the score generated for the respective candidate sequence reaches a predetermined minimum score threshold; and deduplicate the respective candidate sequence in response to the score reaching the predetermined minimum score threshold.

14. The system of claim 13 wherein the processing circuitry is configured to execute the program instructions out of the memory to defer deduplicating at least one candidate sequence from among the two or more candidate sequences in response to the score generated for the at least one candidate sequence failing to reach the predetermined minimum score threshold.

15. The system of claim 12 wherein the processing circuitry is configured to execute the program instructions out of the memory to obtain a correlation function that takes the score generated for each candidate sequence as input, and produces an expected data reduction ratio (DRR) gain as output.

16. The system of claim 15 wherein the processing circuitry is configured to execute the program instructions out of the memory to deduplicate the respective candidate sequence in response to the expected DRR gain exceeding a predetermined minimum DRR gain threshold.

17. The system of claim 9 wherein the deduplication criteria includes an average compression ratio across target data elements of a possible target sequence being at least a desired ratio or percentage.

18. The system of claim 9 wherein the deduplication criteria includes a bias toward longer possible target sequences.

19. A computer program product including a set of non-transitory, computer-readable media having program instructions that, when executed by processing circuitry, cause the processing circuitry to perform a method comprising:

selecting, from among a plurality of unaligned data elements, two or more candidate sequences of unaligned data elements, the plurality of unaligned data elements being unaligned to native page boundaries of a storage system, and each candidate sequence satisfying predetermined deduplication criteria that includes a minimum candidate sequence length;

obtaining a de-duplicability hint for at least one unaligned data element in at least one of the two or more candidate sequences, the de-duplicability hint indicating that the at least one unaligned data element may be deduplicated based on at least one target data element; and for a respective candidate sequence from among the two or more candidate sequences that has a highest number of de-duplicability hints, deduplicating the respective candidate sequence based on a target sequence that includes the at least one target data element.

20. The computer program product of claim 19 wherein the method comprises:

deferring deduplicating at least one candidate sequence from among the two or more candidate sequences in response to the at least one candidate sequence having fewer de-duplicability hints than the respective candidate sequence.

* * * * *